United States Patent [19]

Long

[11] Patent Number: 5,033,194
[45] Date of Patent: Jul. 23, 1991

[54] HAND OPERATED METAL SHEARS

[76] Inventor: Joseph F. Long, 1335 Lost Creek Blvd., Austin, Tex. 78746

[21] Appl. No.: 447,167

[22] Filed: Dec. 7, 1989

Related U.S. Application Data

[63] Continuation-in-part of Ser. No. 242,427, Sep. 8, 1988, abandoned, which is a continuation-in-part of Ser. No. 157,540, Feb. 19, 1988, abandoned, which is a continuation-in-part of Ser. No. 14,933, Feb. 9, 1987, Pat. No. 4,753,011.

[51] Int. Cl.[5] .................. B23D 29/02; B26B 13/28
[52] U.S. Cl. .................................. 30/241; 30/229
[58] Field of Search ............. 30/241, 242, 243, 249, 30/250, 251, 248, 245, 363, 182–185, 257, 258, 229, 235, 236, 238

[56] References Cited

U.S. PATENT DOCUMENTS

| | | | |
|---|---|---|---|
| 1,938,666 | 12/1933 | Novy et al. | 30/229 |
| 2,224,226 | 12/1940 | Jensen | 30/229 |
| 2,238,933 | 4/1941 | Fischer | 30/238 |
| 2,567,129 | 9/1951 | Shoffner | 30/241 |
| 4,050,154 | 9/1977 | Oetiker | 30/363 |

*Primary Examiner*—Frank T. Yost
*Assistant Examiner*—Rinaldi Rada
*Attorney, Agent, or Firm*—Joseph F. Long

[57] ABSTRACT

An improved hand operated metal shears comprising an open lower cutter and a replaceable upper cutter that slides in a raceway in the upper handle and is forced downward thru a workpiece into the lower cutter when upper and lower handles are biased together thus shearing out a segment of a workpiece, the lower cutter being attached to the upper handle by a specially shaped post so that either straight lines, curved, or odd shaped cuts may be made.

6 Claims, 2 Drawing Sheets

HAND OPERATED METAL SHEARS

This invention pertains to an Improved Hand Operated Metal Shears and is a continuation-in-part of my Ser. No. 07/242,427, filed 09/08/1988, abandoned, which is a continuation-in-part of my Ser. No. 07/157,540, filed 02/19/88, abandoned which in turn is a continuation-in-part of my Ser. No. 07/014,933, filed 2/09/87, now U.S. Pat. No. 9,753,011.

BACKGROUND OF THE INVENTION

Continued development has lead to a further improved shears. In my Ser. No. 242,427 a triangular shaft limited the turning radius of the shears and a convex cutter with the triangular shaft did not produce a smooth rounded cut. The present improvement removes metal in a segment that may be approximately ⅜" wide and approximately ½" long and the upper cutter pushes downward to cut out this ⅜"×½" segment square on one end and with modified elliptical shape on the leading end. Cut pieces fall by gravity and cannot interfere with further cutter action. In one embodiment the current invention comprises an upper handle, a lower handle, a replaceable upper cutter with a modified elliptical shape leading edge and square on the trailing edge, a lower cutter shaped to cuttably engage the upper cutter; a specially shaped post to secure smooth rounded cuts with a base of essentially the same width as the opening in the lower cutter and with the height being the width of the opening in the lower cutter; this post connecting the lower cutter to the body which connects to the upper handle; and a threaded pivot pin and a spring that biases apart the upper and lower handle.

The face of the upper cutter is designed to produce a shearing action as opposed to a punching action to allow use of minimum force on the handles bearing the cutters together.

The shears as we have described fills a need for hand operated shears that will operate smoothly to cut either to the right or to the left or straight ahead as well as to cut out odd shapes in metal or plastic. Further, the cutters may easily be sharpened—a file can be used to re-establish a sharp right angle cutting edge on the lower cutter while the upper cutter may be easily removed and ground. Normally there would be little need to sharpen the upper cutter as it may be made of very hard material.

SUMMARY OF THE INVENTION

The improved shears may be described as follows:

A. a lower cutter with an opening which may be approximately ⅜" by ½" of hardened tool steel with the upper edge being a flat shaped right angled cutting edge:

B. a specially shaped post which may be approximately ⅜" in width at the base with the height being approximately ⅜"; the length of the specially shaped post connecting the lower cutter to the lower portion of the upper handle may also be approximately ⅜";

C. a opening in the lower portion of the upper handle sized to admit a removable upper cutter which may have a cutting face 0.001" less than ⅜" in width and 0.001" less than ½" in length with this upper cutter being approximately 2½" long; the opening provided in the upper handle further comprises a raceway so positioned that the upper cutter may be moved downward and fit closely into the lower cutter; a pin in the upper cutter moveably connects the cutter with each side of the yoke-shaped end of the lower handle; this end of the lower handle being suitably shaped and pivotally connected with the upper handle and having a slotted opening to admit the pin of the upper cutter so that biasing the handle upward will force the upper cutter downward into the lower cutter and spring loading of the lower handle downward causes the upper cutter to retract into the upper handle;

D. a spring to bias the two handles apart with a suitable stop in the upper handle to limit the travel to be just sufficient to fully retract the upper cutter into the upper handle;

E. the cutting face of the upper cutter from the side view would be a sharp projection approximately 1/16" long on the frontal edge with a downward slope toward the trailing edge; the shape of cutting face is designed to shear rather than punch out the material being removed thereby minimizing the force required. Since the upper cutter is replaceable various shaped cutters may be used with differing materials. The downward sloping cutting edge serves to have a force component pushing the upper cutter against the specially shaped connecting post to cause the upper cutter to properly cuttably engage the lower cutter.

The shape of the specially shaped post connected the lower cutter to the upper handle is as follows in one embodiment: a forward edge is flat and continuous with the back ⅜" side of the opening in the lower cutter. Now if one were to take a compass and draw a chord with a ⅜" radius using each end of the flat radius as a pivot point the point of intersection of the two chords would be the apex of the modified triangle so drawn and this would be the shape of the specially shaped post. The width of the base and height of the modified triangle would be the same. With this specially shaped post as described the shears may cut out any angle giving the same advantage as a cylindrical post in my previous patent but allowing a cutter with a square side to be used. With use of a cylindrical post a cutter with a sharp tine on each side of the cylindrical post is necessary but wears quite rapidly, causing a problem. This specially shaped post as described eliminates this problem. In a second embodiment post with a T shaped cross section with the top of the T being flush with the end of the lower cutter opening is used and operates similarly to the specially shaped post as described in the first embodiment.

The leading tip of the upper cutter which, of course, cuttably engages the lower cutter is exactly the same size and shape as the back end of the specially shaped post described. With a specially shaped post and the same shape on the forward edge of the upper cutter the shears will smoothly cut out a rounded piece, cutting either to right or left. The pointed end over the exterior of the lower box-like cutter also serves to allow the user to easily follow a line. The shape of the upper and lower handles are such as can be noted from the drawings that a users hand remains above the workpiece.

Obviously minor changes may be made in the embodiments of the shears as described and we mean only to be limited to the general purpose and design as outlined in these claims and specifications.

DETAILED DESCRIPTION OF THE INVENTION

Figure 1:
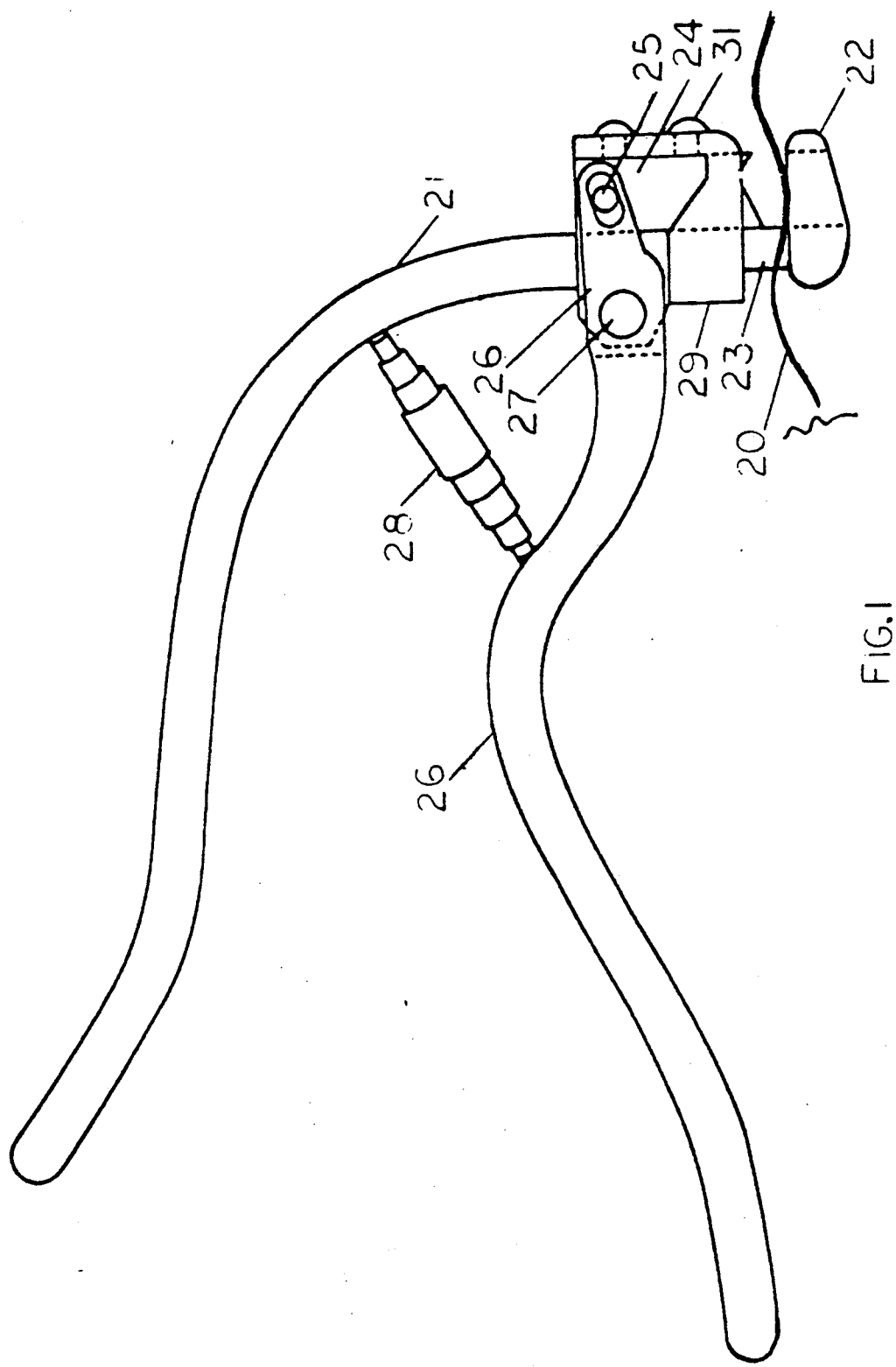
FIG. 1 is a side view of a first embodiment of the shears with dotted lines to indicate internal construction. With the handles being biased fully apart the upper cutter remains above a corrugated workpiece.

We may best describe the invention by a detailed description of the drawings. In FIG. 1 we show an upper handle 21, a lower handle 26 and a flat spiral spring 28. The spring 28 slides over retaining posts when partially compressed and the shape of the end of the lower handle 26 and the body 29 in the upper handle 21 limits how far handle 26 may be biased apart from handle 21 when handle 21 is pivotally connected into handle 26 by a pivot pin 27 that may be threaded and approximately $\frac{3}{8}$" in diameter. A slideable removable upper cutter 24 may approximately be $\frac{3}{8}$" thick, $\frac{1}{2}$" wide and 1$\frac{1}{2}$" long. This cutter 24 is preferably made of stellite or hardened tool steel. Dimensions of the Yoke-shaped end of handle 26, pin 25 in cutter 24 and location of pivot pin or shoulder bolt 27 are such that when handle 21 is completely biased apart from handle 26 that cutter 24 is essentially fully retracted into handle 21 and when handle 26 is pulled full way toward handle 21 cutter 24 is extended into a lower cutter 22 which may be hardened tool steel. Thus if a workpiece is between cutter 24 and against post 23 a piece the size of the opening in cutter 22 which may be about 0.001" larger than cutter 24 will be cut by shearing action as the cutter 24 engages cutter 22 thru the workpiece. The cutting face of cutter 24 may have various shapes. The shape as shown is designed to facilitate shearing rather than punching action to remove a segment of the workpiece.

The specially shaped post 23 is essentially the width of the cutter 24 so that as segments of the workpiece are removed the shears may move freely forward or be turned approximately 90 degrees sideways with each forward move, thus allowing the shears to cut out various shapes. Cutter 24 has a leading edge the same shape as post 23 and a square trailing edge with the same shaped opening in the lower cutter 22. Even a corrugated work piece 20 may be firmly supported for cutting as shown.

As indicated the cutter 24 slides into a short raceway formed by the shapes of the opening in upper handle 21. When pivot pin 27 is removed and lower handle 26 disengaged from upper handle 21, removal and replacement of upper cutter 24 may be accomplished by sliding cutter 24 thru cutter 22 and reconnecting handle 26 with pivot pin 27. Pin 25 may be made removable and cutter 24 is then removable easily by removing pin 25.

The body 29 of the shears may be approximately 2$\frac{1}{2}$" long, 1$\frac{1}{8}$" wide and $\frac{3}{4}$" thick and contains a raceway for cutter 24, a yoke-shape end on handle 26 and a pivot pin 27 and is attached to upper handle 21.

Figure 2:
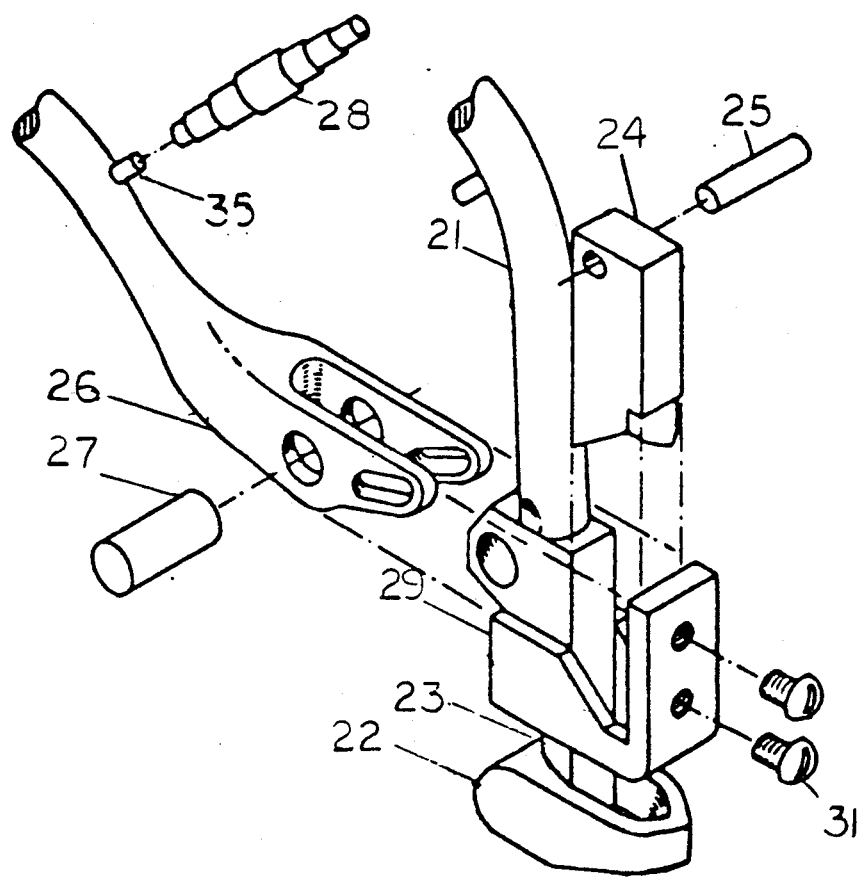
FIG. 2 shows an expanded view of the shears.

FIG. 2 shows an expanded view of the shears showing all the elements as described in a perspective view and also showing pins 35 to hold spring 28 and screws 31, which are preferably brass to provide some adjustment and relieve galling of cutter 24 as it moves.

Figure 3:
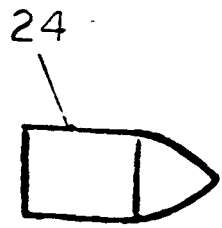
FIG. 3 shows a bottom view of the upper cutter 24.

FIG. 3 shows a bottom view of upper cutter 24. This cutter may be $\frac{3}{8}$" and sized to fully retract into body 29, FIG. 1, when handle 26, FIG. 1 is biased by spring 28, FIG. 1 into the fully open portion. The cutter face as show in side view in FIG. 1, may project upward about 30 degrees from a trailing edge and then slope downward about 15 degrees to give a shearing rather than punching action when cuttably engaged with lower cutter 22. The cutter 24 is machined to closely fit into and cuttably engage the opening in lower cutter 22.

Figure 4:
FIG. 4 shows a cross section of connecting post 23 connecting the lower cutter to the body of the shears.

In FIG. 4 we show a cross section of connecting post. The special shape of connecting post 23 is important for desired operation of the shears. The upper cutter 24 is essentially the same width as connecting post 23 and when a portion of the workpiece is removed the shears may be moved forward until the base of the specially shaped post 23 contacts the workpiece and with the shape of the post 23 as shown the shears may be moved straight ahead or more than 90 degrees from a straight line with each portion removed. A circle with less than 4" diameter or other odd shapes may be easily cut out in this manner. The flat leading edge of post 23 allows a rectangular back edge of upper cutter 24 to give a cutter shape to cutter 24 that wears well. The right angled cutting edges of both upper cutter 24 and lower cutter 22 may be restored to a sharpened condition by grinding when necessary.

Figure 5:
FIG. 5 shows a cross section of connecting post 23A that may be used in a second embodiment to replace post 23, FIG. 1 in the first embodiment.

FIG. 5. We show a T shaped cross section of a post 23A that may be used in a second embodiment to replace post 23 as shown in FIG..1 in a first embodiment of the invention. Operation of the shears is the same with either specially shaped post 23 or T shaped post 23A.

What is claimed is:

1. A hand operated metal shear comprising:
   a) an upper handle attached to a body;
   b) a lower cutter attached to said body with a specially shaped post;
   c) a removable upper cutter that slides in a raceway in said body;
   d) a lower handle with a first grippable end and with a yoke-shaped second end constructed to slide over said body and pivotally fasten to said body with slotted openings in said yoke-shaped second end moveably engaging a pin through said upper cutter so that when said lower handle is biased toward said upper handle said upper cutter is forced downward to cuttably engage said lower cutter and when said lower handle is biased away from said upper handle said upper cutter is retracted into said body;
   e) a spring means to bias apart said upper handle and said lower handle, said lower handle being shaped to be above a workpiece when said upper handle and said lower handle are fully biased apart.

2. A hand operated metal shear as in claim 1 wherein said upper cutter has a cutting face shaped to cause a shearing action on a workpiece when said upper cutter cuttably engages said lower cutter.

3. A hand operated metal shear as in claim 2 wherein said cutting face of said upper cutter comprises a first portion which project upward about 30 degrees from a trailing edge of said upper cutter and a second portion which downward about 15 degrees to a pointed leading edge of said upper cutter.

4. A hand operated metal shear as in claim 1 where said upper cutter has a pointed leading edge and a square trailing edge that cuttably engages said lower cutter.

5. A hand operated metal shear comprising:
a) a body attached to an upper handle;
b) a lower handle with a yoke-shaped end pivotally connected to said body with slotted openings in said yoke-shaped end of said lower handle moveably engaging a pin in an upper cutter, said upper cutter having two side cutting edges curveably connected with a frontal cutting point and moveable in a raceway in said body;
c) a lower cutter attached to said body with a shaped post and having cutting edges sized so that said upper cuter may cuttably pass thru said lower cutter;
d) a spring means to bias apart said lower handle and said upper handle with said lower handle being above a workpiece when said lower handle and said upper handle are fully biased apart.

6. A hand operated metal shear comprising:
a) an upper handle attached to a body;
b) a lower cutter with two side cutting edges and a frontal cutting edge attached to said body with a T shaped post;
c) a lower handle terminating in a U shape that slides over said body and is pivotally connected to said body and also pivotally connected with an upper cutter, said upper cutter having a rectangular body terminating in a shape to cuttably engage said lower cutter with said upper cutter slideably contained in a raceway in said body;
d) a spring to bias apart said upper handle and said lower handle, said lower handle being above a workpiece when said lower handle and said lower handle are fully biased apart.

* * * * *